(No Model.)
A. P. LORD.
NUT AND BOLT LOCK.
No. 547,491. Patented Oct. 8, 1895.
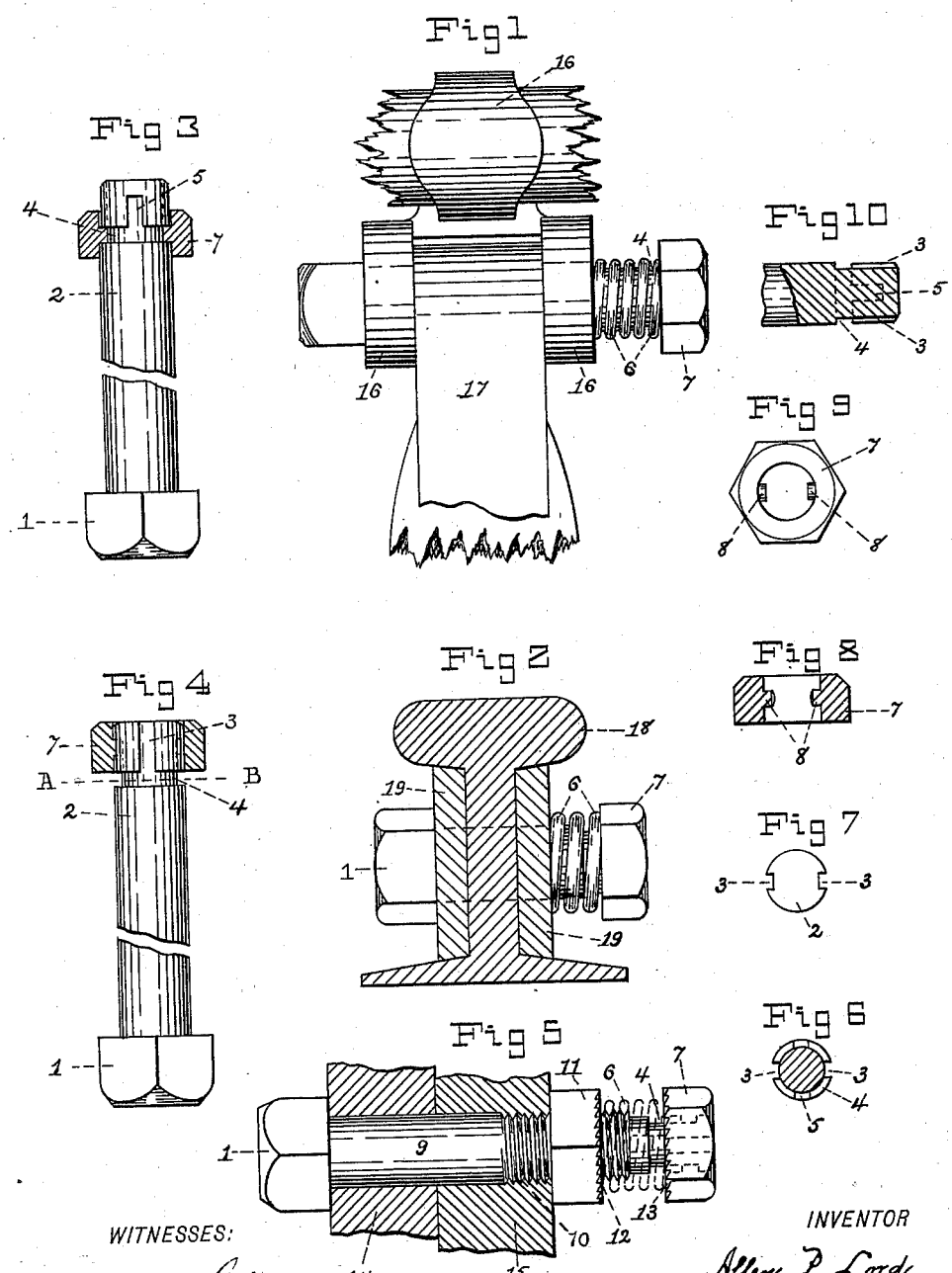
WITNESSES:
INVENTOR
Allen P. Lord
BY
Geo. R. Hagar
HIS ATTORNEY.

UNITED STATES PATENT OFFICE.

ALLEN P. LORD, OF BRADFORD, PENNSYLVANIA, ASSIGNOR OF ONE-HALF TO ROY W. EDGETT, OF SAME PLACE.

NUT AND BOLT LOCK.

SPECIFICATION forming part of Letters Patent No. 547,491, dated October 8, 1895.

Application filed January 22, 1895. Serial No. 535,763. (No model.)

*To all whom it may concern:*

Be it known that I, ALLEN P. LORD, a citizen of the United States, residing at Bradford, in the county of McKean and State of Pennsylvania, have invented a new and useful Improvement in Nut and Bolt Locks, of which the following is a specification.

The objects of my invention are to provide a nut and bolt so constructed that after the nut is set in place on the bolt it cannot of itself become loosened and will remain intact until released; to provide a nut and bolt so constructed that the nut can be connected to or disconnected from the bolt without the aid of a wrench, and, further, a nut-lock mechanism that can be applied to any style of machine and carriage bolts.

I attain these objects by the mechanism illustrated in the accompanying drawings, in which—

Figure 1 represents my nut and bolt in use in a thill-coupling with the end of the thill secured therein. Fig. 2 represents my nut and bolt locked in place, securing the fish-plates to a car-rail. Fig. 3 represents my bolt with the several recesses in the end and a cross-section view of the nut. Fig. 4 represents a similar view of my nut and bolt in a position at right angles to that of Fig. 3. Fig. 5 represents a view of the ordinary machine-bolt in use provided with my improved nut-lock mechanism. Fig. 6 represents a cross-section view of Fig. 4 through the lines A B, showing the several recesses. Fig. 7 represents an end view of my bolt. Fig. 8 represents a cross-section view of my nut. Fig. 9 represents an end view of my nut, and Fig. 10 represents an axial section of the end of my bolt.

Similar numerals refer to similar parts throughout the several views.

Numeral 1 is the bolt-head.

2 is the bolt, provided with the longitudinally-slotted recesses 3, the annular recess 4, and the locking-seats 5.

6 is a helical spring.

7 is my nut provided with the inside projections 8. The threadless bolt and nut with plain faces are shown in Figs. 1, 2, 3, and 4, and in Fig. 5 is shown a machine-bolt 9, provided with the screw-thread 10 and the nut 11, having a serrated face 12. The end of the bolt 9 is provided with my improvement, consisting of the annular recess 4, the longitudinal recesses 3, and the locking-seats 5, the nut 7, provided with the serrated face 13, and the helical spring 6. The object of the serrated faces on the nuts 7 and 11 is to provide bearings for the ends of the helical spring 6. 14 and 15 are portions of plates provided with bolt-orifices.

There are many advantageous uses to which my threadless bolt and nut can be applied in preference to the ordinary machine bolt and nut, which require a wrench or its equivalent for holding the head rigid while the nut is being screwed on or off, for which another wrench is required. One of these uses referred to is shown in Fig. 1, which, as stated above, shows my improved bolt and nut securing a thill to a thill-coupling. The method of making the connection is by inserting the bolt 2 through the bolt-orifices of the thill-coupling 16 and thill 17. The spring 6 is then placed over the end of the bolt and the nut 7 is slipped on by compressing the spring 6 until the projections 8, sliding in the slotted recesses 3, reach the annular recess 4, as shown in Fig. 3. The nut 7 is then rotated until the projections 8 reach and pass into the locking-seats 5, (see Fig. 4,) where they are held by the resilience of the spring 6. A reverse movement of the nut will as readily release it. Fig. 2 shows the same application in connecting together the car-rail 18 and the fish-plates 19.

The threadless bolt and nut can be used with advantage wherever the strain on the bolt is at right angles thereto, the nut being used only for the purpose of keeping the bolt in place; but when the strain on the bolt is longitudinal and the bearings are on the head and nut the threaded bolt, as shown in Fig. 5, is more applicable, particularly when there is a tendency for a nut to become loosened by unscrewing. In this figure the bolt 9 is shown inserted through the bolt-orifices of the parts 14 and 15, the head 1 bearing against the part 14, and the nut 11 screwed against the part 1. The nut 7 is also shown, and the spring 6 (represented by dotted lines) inserted between the nuts 11 and 7, the ends of the spring 6 being seated, respectively, in the serrations on the faces of the nuts 11 and 7. The nut 7 being fixedly secured on the bolt by the projections 8, which are held in the locking-seats 5 by means of the resilience of the spring 6, causes the spring 6 to have a torsion strain on the nut 11, and thereby prevents it from unscrewing.

In the manufacture of my improved bolt and nut lock I do not wish to be restricted to a construction of the slotted recesses 3 in a straight line, as they would perform the same function if made spiral. I, however, prefer them being made in a straght line on account of the cheapness of so constructing them under the drop-forging process.

Having thus described my invention, what I claim as new, and desire to secure by Letters Patent, is—

1. In a nut and bolt locking device the combination with the threadless bolt provided with the annular recess, the longitudinal recesses and the locking seats the threadless nut provided with one or more inner projections and a spring substantially as shown and described.

2. In a nut and bolt locking device, the combination with the threaded bolt provided with the annular recess, the longitudinal recesses, and the locking seats, of the threaded nut provided with a serrated face, the threadless nut provided with one or more inner projections, and a serrated face, and the helical spring, all substantially as shown and described, and for the purpose set forth.

ALLEN P. LORD.

Witnesses:
GEORGE J. WOLF,
JAMES GEORGE.